(12) United States Patent
Hamed

(10) Patent No.: US 11,077,908 B1
(45) Date of Patent: *Aug. 3, 2021

(54) BICYCLE SHIFTER USER INTERFACE

(71) Applicant: Hazem Nihad Hamed, Huntington Beach, CA (US)

(72) Inventor: Hazem Nihad Hamed, Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,779

(22) Filed: Jul. 13, 2020

(51) Int. Cl.
| | |
|---|---|
| *B62J 45/20* | (2020.01) |
| *B62J 45/412* | (2020.01) |
| *B62J 45/415* | (2020.01) |
| *B62M 9/1242* | (2010.01) |
| *H04W 4/80* | (2018.01) |
| *B62J 50/22* | (2020.01) |
| *B62M 25/00* | (2006.01) |

(52) U.S. Cl.
CPC ............ *B62J 45/20* (2020.02); *B62J 45/412* (2020.02); *B62J 45/4152* (2020.02); *B62J 50/22* (2020.02); *B62M 9/1242* (2013.01); *H04W 4/80* (2018.02); *B62M 2025/003* (2013.01); *B62M 2025/006* (2013.01)

(58) Field of Classification Search
CPC . B62J 45/20; B62J 50/22; B62J 45/412; B62J 45/4152; B62M 9/1242; B62M 2025/003; B62M 2025/006
See application file for complete search history.

(56) References Cited

U.S. PATENT DOCUMENTS

| | | | |
|---|---|---|---|
| 6,450,922 B1 * | 9/2002 | Henderson | A63B 24/0084 482/8 |
| 8,977,450 B2 * | 3/2015 | Cheng | B62M 25/08 701/55 |
| 9,234,580 B1 * | 1/2016 | Usui | B62M 25/08 |
| 9,284,018 B2 * | 3/2016 | Tauchi | B62M 25/08 |
| 9,975,603 B2 * | 5/2018 | Bortolozzo | B62M 9/133 |
| 10,239,582 B2 * | 3/2019 | Munch | B62M 6/45 |
| 10,473,214 B2 * | 11/2019 | Cheng | F16H 61/6649 |
| 10,640,171 B2 * | 5/2020 | Hamed | B62M 9/123 |
| 2001/0042421 A1 * | 11/2001 | Feng | B62M 25/04 74/502.2 |
| 2004/0235597 A1 * | 11/2004 | Guderzo | B62M 9/132 474/70 |
| 2014/0371953 A1 * | 12/2014 | Miller | B62M 25/08 701/2 |
| 2015/0374311 A1 * | 12/2015 | Niederberger | A61B 5/4566 600/301 |
| 2018/0105230 A1 * | 4/2018 | Munch | B62M 9/123 |
| 2018/0268668 A1 * | 9/2018 | Tetsuka | G01D 5/14 |
| 2019/0185109 A1 * | 6/2019 | Howell-McLean | B62M 25/08 |
| 2019/0233054 A1 * | 8/2019 | Rodgers | F16H 25/20 |
| 2019/0301598 A1 * | 10/2019 | Sonenthal | B62M 25/08 |

* cited by examiner

*Primary Examiner* — Behrang Badii
*Assistant Examiner* — Daniel L Greene

(57) ABSTRACT

A highly adaptable user interface for gearing based bicycle power transmission devices powered by a linear servo actuator slaved to an electronic control system serving to automatically shift into desirable gearing ratios under user predefined shifting criteria adaptable in real time to rider conditioning, comfort level and road conditions thereby alleviating manual shifting tasks and achieving optimal pedal rate and effort settings for the rider. Ability to switch to manual mode augments rider total control of disclosed device.

6 Claims, 10 Drawing Sheets

BICYCLE SHIFTER USER INTERFACE

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The disclosed invention relates to the cycling transportation and sporting industry, specifically to modern bicycle designs typically making use of rear axle other geared hubs and other gearing based bicycle power transmission devices serving to engage proper ratio gearing through linkage to a set of handlebars leveraging control assemblies permitting the rider to achieve an optimal drivetrain ratio, thereby facilitating comfortable pedaling rates and efforts thereof depending on desired road speed, rider conditioning, road inclination and other circumstantial conditions.

BACKGROUND OF THE INVENTION

Bicycles have existed for many years serving throughout as transportation and sporting means. Over the great time span since their inception, the technology has evolved with numerous designs and advancements predominantly geared toward addressing rider comfort. With the initial designs from many years ago comprising a single speed power transmission mechanism often requiring the rider to either exert undue effort on the pedals or has to alternate the pedals at an uncomfortably high rate to achieve desired riding speed, a need was recognized for multiple powertrain ratios to facilitate acceptable pedaling rates and efforts. A de-facto four bar linkage shifting mechanism subsequently emerged comprising additional power transmission sprockets of various number of teeth added in the axial directions of the pedals mechanism as well as power transmission rear wheel along with an integral chain tensioning apparatus and a set of rider lever based sheathed cable actuation mechanisms permitting selection of desired combinations of front and rear drive sprockets to suit road condition, rider biometrics and preference. Advancements in the actuation mechanism included indexing capability of the operator lever assembly so that the actuation of the sprocket alternation mechanism takes place in an indexing fashion consistently properly aligning the chain with desired sprocket thereof rather than one continuous motion requiring the rider to guess the proper chain position often leading to positioning errors. With the fundamental disadvantage of the de-facto derailleur design inability to shift during stoppage, a variety of designs replacing the derailleur assembly with gearing based power transmissions, some integrated internally into the bicycle rear hub and others incorporated at or near the bicycle pedaling assembly, consequently evolved thereby providing the rider with the same power transmission shifting capability through the same sheathed cable shifting apparatuses in a more self-contained and sealed package which the rider could shift at will without the otherwise necessary bicycle pedaling motion.

Other but less successful attempts in the evolution of the conventional bicycle design was the technology to automate the power transmission shift operation thereby relieving the rider of the constant manual shifting task. Numerous attempts have been made over a many years to provide a robust yet commercially successful product. Some were attempts sacrificing robust componentry for cost, tight packaging and commerciality, in the process adding extraneous components such as springs and levers to prevent premature failure, while others were based on complex mathematical or fixed criteria based on "one for all" approaches. All ultimately achieving varying levels of success but uniformly falling short of meeting widespread commercial acceptance. On the fundamental level, most of these offerings had in common the failure to recognize that acceptance of these various designs ultimately boiled down to adaptability by a user population widespread in biometrics, endurance, strength and other personal attributes.

The inventor hereby discloses an electrically powered cable shifting apparatus lending itself to automatic control of the bicycle shifting tasks through a servo motor based actuator, a robust microprocessor based control system making use of various speed, controls and road inclination sensors, and a highly adaptable user interface which, through a set of operator predefined and in real time adjustable criteria, is used to place the bicycle power transmission means in an optimal position on a consistent basis in order to provide a more pleasurable and comfortable experience for the rider thereby consistently achieving acceptable pedaling rates and efforts based on the ever changing need of the rider.

DISCUSSION OF PRIOR ART

The following is a brief summary of prior art deemed pertinent to the bicycle shifter user interface of the present invention.

U.S. Pat. No. 10,640,171 B2 outlines a derailleur based bicycle shifter control apparatus and user interface comprising a "Teach Mode", a "Programming Mode" and an "Operation Mode" for control of both of front and rear derailleurs. Notwithstanding endeavor in the art, this patent is limited to outlining method of application of this advancement in the art to other bicycle design making use of gearing based power transmission devices often located at the rear hub and the pedals of the bicycle.

U.S. Pat. No. 10,167,056 B2 discloses a bicycle transmission control apparatus making use of various sensors and using a complex algorithm for automatically shifting a bicycle drive train. Notwithstanding the endeavor in the art, this approach does not take into account the rider metrics or conditioning and therefore could very possibly fall short of achieving intended objective.

U.S. Pat. No. 9,975,603 B2 discloses a bicycle transmission control apparatus making use of various sensors including a rider heart rate monitor and using a complex algorithm for automatically shifting a bicycle drive train. Notwithstanding the endeavor in the art, although this approach does partially take into account the rider conditioning it falls short of other important physical limitations like gender, strength and weight.

U.S. Pat. No. 9,284,018 B2 discloses another bicycle transmission control apparatus geared toward application of an inclination sensor and uses a simplified algorithm for automatically shifting a bicycle drive train. Notwithstanding the endeavor in the art, this approach does not take into account a multitude of parameters that impact viability of automatic shifting and therefore sure to fall short of intended objective.

U.S. Pat. No. 9,234,580 discloses a control device for a bicycle automatic transmission comprising an entailed computation algorithm based traveling resistance computed with readings of torque measurements, cadence or pedaling rate, bicycle speed and mass of bicycle and rider. As this approach is fundamentally based on assuming that two riders with the same weight but with significantly different muscles to fat ratios have synonymous abilities, the end result that this approach is likely to yield seems to be less than optimal. This disclosure, additionally falls short of providing a bicycle shifting criteria highly adaptable by the rider devoid of any complex mathematical calculations destined to fall short of providing riders an adequate result.

U.S. Pat. No. 8,977,450 identifies a bicycle derailleur shifting apparatus making use of a pedal crank angle sensor to calculate optimal shift timing. This disclosure is based on the assumption that a great effort is needed post the actual sprocket shift taking place such as in premature shifting requiring the rider to exert undue effort while in fact a properly timed automatic shifter will conduct this action when the bicycle speed has reached a threshold defined by the rider, where the post shift pedaling effort is acceptable. With the outlined sifting action solely based on a pedals crank angle sensor, disclosure does not seem to define a cooperating and functional system. Being very limited in nature, outlined approach would be best applied to an existing comprehensive bicycle automatic gear shifting apparatus.

U.S. Pat. No. 8,900,087 outlines a disclosure for an automatic bicycle shifting apparatus based on a mechanical governor where centrifugal force due to wheel speed results in a planetary gear change. Although this disclosure could very well result in an operable system, shift settings are solely a function of bicycle speed thereby ignoring rider biometrics, road conditions and personal preferences at the time the actual riding is taking place in the process likely falling short of preference and capability of the rider.

U.S. Pat. No. 8,512,182 details an intricate mechanical automatic bicycle shifting apparatus based on mechanical torque measurements with operator strength selectable criteria. As is the case with most mechanical devices shift action is mostly preset depriving the rider from making changes in real time without stopping. The sheer complexity of the outlined design comprising levers springs, weights, etc. . . . is likely to prove less reliable as well as less user friendly than other simpler design making use of electronics to produce desired optimal result for the rider.

U.S. Pat. No. 8,360,909 B2 discloses yet another bicycle transmission control apparatus making use of various sensors and using a complex algorithm for automatically shifting a bicycle drive train. Notwithstanding the endeavor in the art, this approach does not take into account the rider metrics or conditioning and therefore could very possibly fall short of achieving intended objective.

U.S. Pat. No. 7,892,122 B2 and Reissue Patent U.S. RE41,782 summarize a complex derailleur arrangement making use of torsion spring to permit shifting less bicycle chain motion. In reality, this provision is intended to overcome the great constraint placed on this design by confining the derailleur motor along with reduction gearing to a small housing. As a shift operation less any chain movement sensors confirming shift action is possible, is likely to prove detrimental to this confined and prone to overheating motor, attempt have been made for the derailleur to reach intended positon during shift notwithstanding lack of chain motion so that applied power would cease short of burning the small motor windings thereof. In is noteworthy though, to indicate that this problem does not resolve the shortcoming of the legacy derailleur of not being able to shift less chain motion, this approach simply attempt to overcome the aforementioned challenge inherent to the legacy shifter design. An LCD screen is offered along with manual shift up and down switches as well as with another switch to alternate between manual and automatic shift operation. Without taking into account road conditions and operator preference and granting the rider ability to make changes on the fly without stopping, this disclosure, although a substantial improvement of preceding art, still falls short of providing the rider with an acceptable system with ability to instantaneously achieve desired optimal riding settings with ease.

U.S. Pat. No. 7,547,263 B2 discloses yet another bicycle transmission control apparatus making use of various sensors and using a complex algorithm for automatically shifting a bicycle drive train. Notwithstanding the endeavor in the art, this approach does not take into account the rider metrics or conditioning and therefore could very possibly fall short of achieving intended objective.

U.S. Pat. No. 7,247,108 defines a microprocessor based automatic bicycle derailleur shifting method based on a simplistic logical algorithm for derivation of an adequate combination between front and rear sprockets determined by the inventor to be an adequate approach. Along with prior reasoning, a device that applies across a spectrum spanning from a $50^{th}$ percentile female and a $90^{th}$ percentile male without offering the rider meaningful means to adjust to own riding preference, is essentially guaranteed to produce the unwanted result where the rider has to pedal too fast with too little effort or instead, too slow with too much effort. It is also noteworthy that the inventors of this device did recognize the need to include an otherwise nonexistent user interface into their design. An LCD screen is offered for the rider with manual shift up and down switches along with another switch to alternate between manual and automatic shift operation. Therefore, it is evident that the inventor recognized that the rider would need to get around the automatically computed shift selection of this approach, at least some of the time.

U.S. Pat. No. 6,997,835 B2 discloses a bicycle electrically powered rear derailleur with compliance means for storage of energy so that actuation thereof takes place as needed notwithstanding lack of necessary forward chain motion required by the legacy four bar linkage shifter design. As such an approach alleviates potential motor overheating conditions due to lack of necessary forward chain motion necessary for the derailleur to reach intended position, the seek position of the shift motor is nevertheless achieved with compliance means storing the shifting energy. Important to note that this does not solve the problem of the device being in the wrong setting after stopping, the sole advantage of this invention is relieving the derailleur motor of excess work and thereby minimizing any chances of overheating. It is also worthwhile to note that this additionally places an undesirable side load on the drive chain. Moreover, lack of highly desirable accuracy of the position held by the derailleur since reaction by a mechanical spring is typically proportionate to displacement so that the derailleur final settling position, although typically close, is nevertheless never reached due spring hysteresis and offset by the encountered resistance by the chain and mechanical friction within the derailleur linkage.

U.S. Pat. No. 5,480,356 discloses an electrically powered derailleur where the legacy spring has been replaced with a highly special linear actuator making use of a planetary gearset. It is clear based on the geometry of this invention as outlined in respective art that a major component of the force of the linear actuator is going into thrust in one of the joints while the force component serving to produce the actual shifting action is miniscule. Aside from realizing highly detrimental forces to joint bearings, this approach in turn requires greatly oversizing the actuator to realize an acceptable force output leading to a very costly linear actuator highly prone to failure.

Until disclosures in U.S. Pat. No. 10,640,171 B2 and notwithstanding the long sought after successful design for alleviating the bicycle rider from the demanding task of continually seeking an acceptable shift setting, an effective and highly adaptable by the rider solution to this challenging problem, as can be seen from outlined art, had proven highly elusive. Up to issue of this patent disclosure, lack of disclosed art along with lack of commercially successful and thereby available products facilitating automatic and highly adaptable shifting criteria for the rider is further evidence to the absence of a bicycle automatic shifter, controls and user interface means with these highly desirable characteristics. These disclosures indeed seeks to expand multiple disclosures in U.S. Pat. No. 10,640,171 B2, strictly limited to derailleur based bicycles, to other geared bicycle power transmission devices typically relying on only one power transmission component and not two as often is the case with derailleur based bicycles.

BRIEF SUMMARY OF THE INVENTION

Inventor discloses means for achieving the highly desirable option of relieving the bicycle rider of the drivetrain shifting task typically achieved by a mechanical actuation means through equipping the bicycle shifter mechanism with a servo power actuation device governed by a microprocessor based electronic control system additionally comprising bicycle speed and road condition sensors serving to proactively manage in real time bicycle gearing drive ratio based on operator preset yet constantly definable criteria thereby facilitating an optimal bicycle operation experience for the rider through acceptable pedaling rates and efforts.

The preferred embodiment of the automatic bicycle shifter of the present invention comprises a novel cable actuation mechanism powered by a servo electric motor coupled to a high gearing ratio reducer serving to drive a low pitch threaded screw used to accurately position a mating threaded nut affixed to drive cable and retained in an anti-rotation conduit thereby providing proportionate linear displacement thereof, and slaving said actuation mechanism thereof to a comprehensive microprocessor based controls system additionally comprising a bicycle speed sensor, an inclinometer, and motor power amplifiers serving to drive said actuation servo motor under microprocessor control thereby facilitating automatic bicycle drive powertrain shifting for the operator based on preset and continually available setting criteria presented to the rider through a user friendly interface.

As rider comfort is a continually moving target based on the rider condition often governed by traveled distance, conditioning, road and weather conditions, predefined and fixed shift criteria become objectionable. Consequently, a user interface facilitating means to continually adjust the bicycle shifting criteria with ease is offered in order to successfully realize the intended function of the invention. Emphasis is thereby placed on tailoring the user interface to rider condition in real time by providing slide touch controls realizing ability to proportionately or in a user predefined relationship adjust shifting thresholds up or down. A further level of control is provided to the rider through multiple predefined shifting programs available to recall at will. As road inclination comes into play as well, another sliding touch control is provided for user to adjust programmed shifting thresholds attenuation due to road inclination in real time. Ability to switch to manual is yet another option that the user might result to under certain circumstances so this functionality is also offered by the novel user interface of this invention.

Additional benefits of the user interface of the present invention include presenting the operator through a microprocessor controlled display, shifter settings, cumulative mileage on the bicycle, bicycle speed, trip distance all in English or International Standard units, a stop watch with start, stop and split functions and time and date information.

DETAILED DESCRIPTION OF THE INVENTION

Preferred Embodiment Construction—FIGS. 1-3 & 6.

Figure 1:
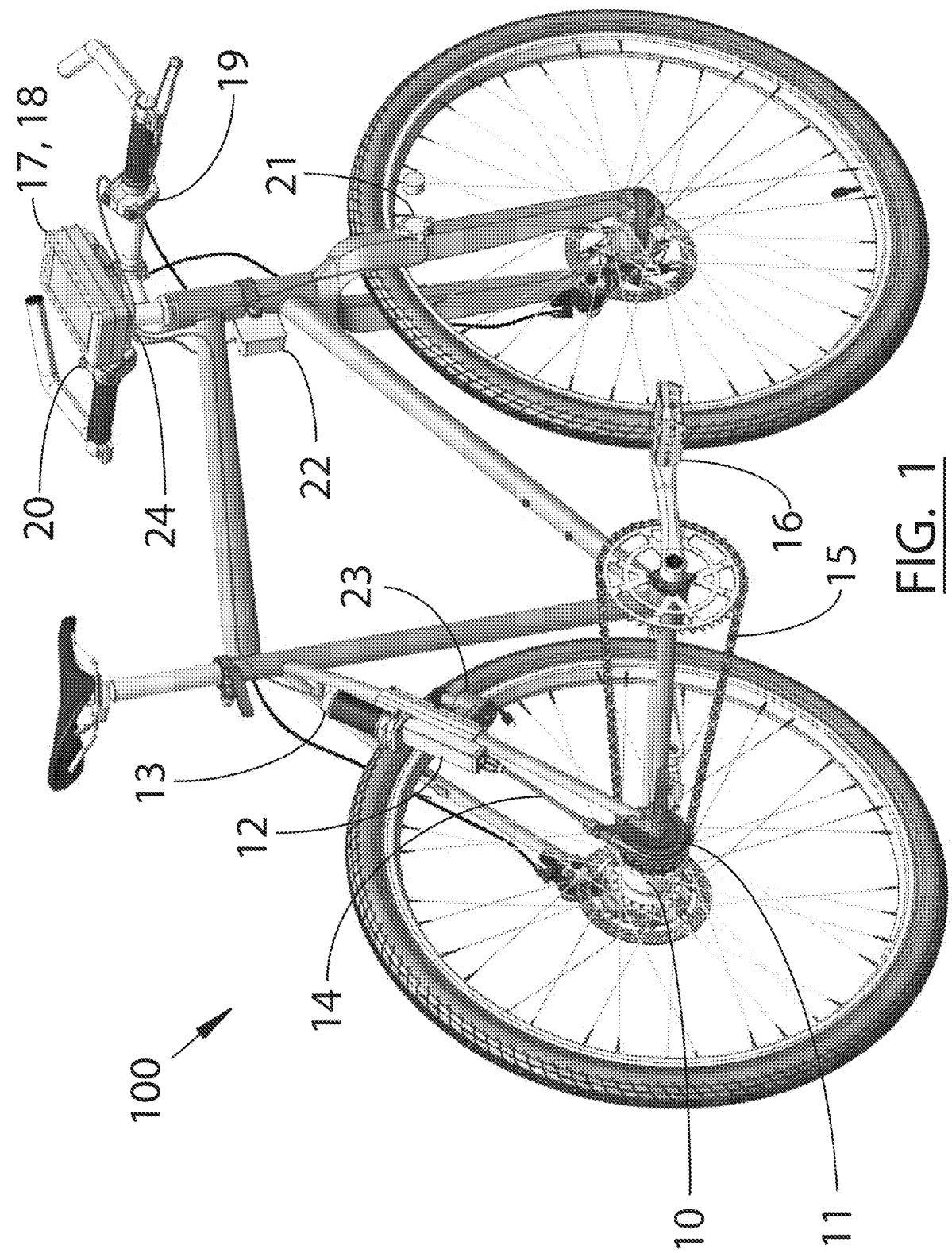
FIG. 1 is a perspective overall view of the systems and components comprising the preferred and alternate embodiments of the bicycle shifter user interface of the present invention.
Figure 2:
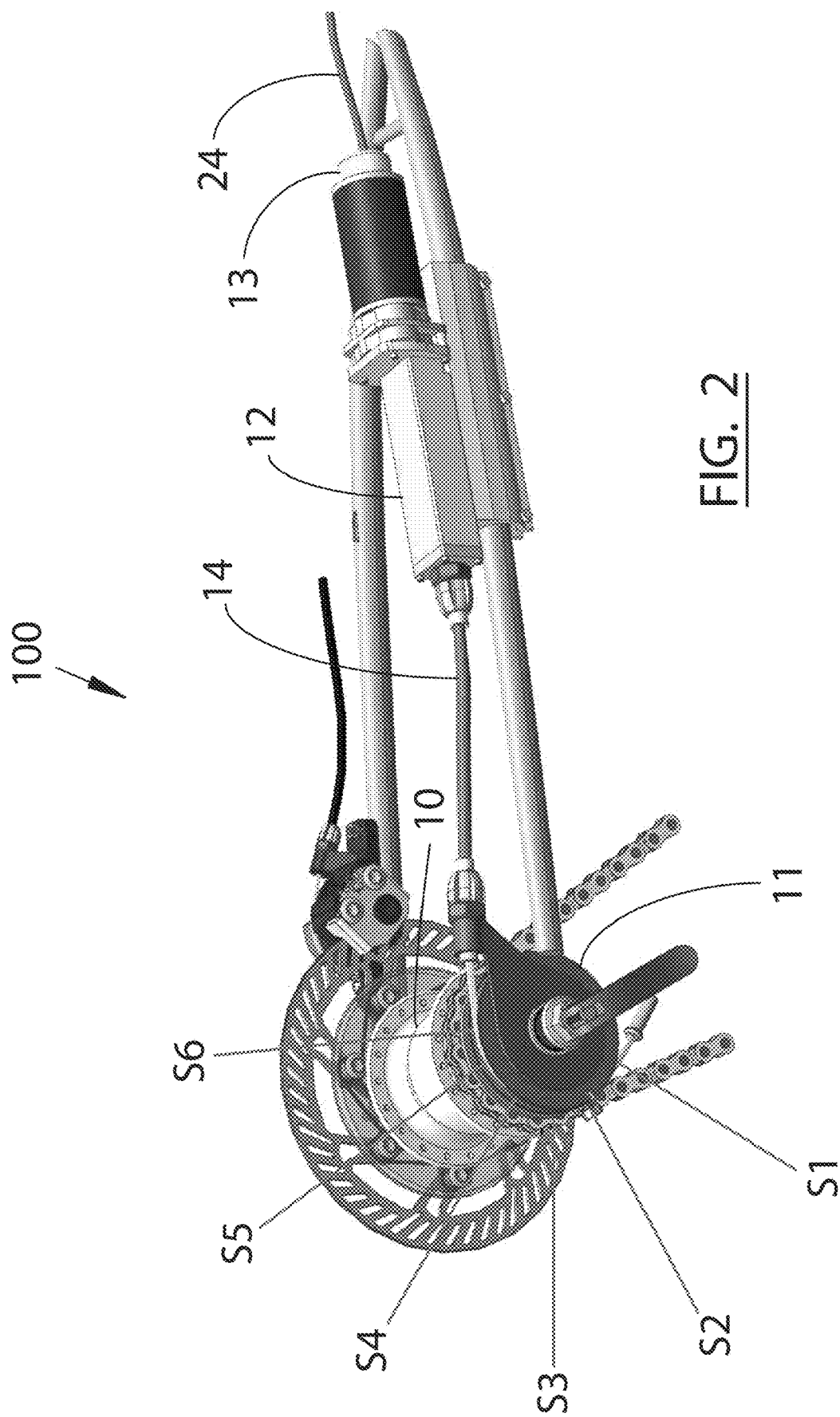
FIG. 2 is a perspective view of the novel cable shifting linear actuator of the preferred and alternate embodiments of the bicycle shifter user interface of the present invention connected to a common gearhub.
Figure 3:
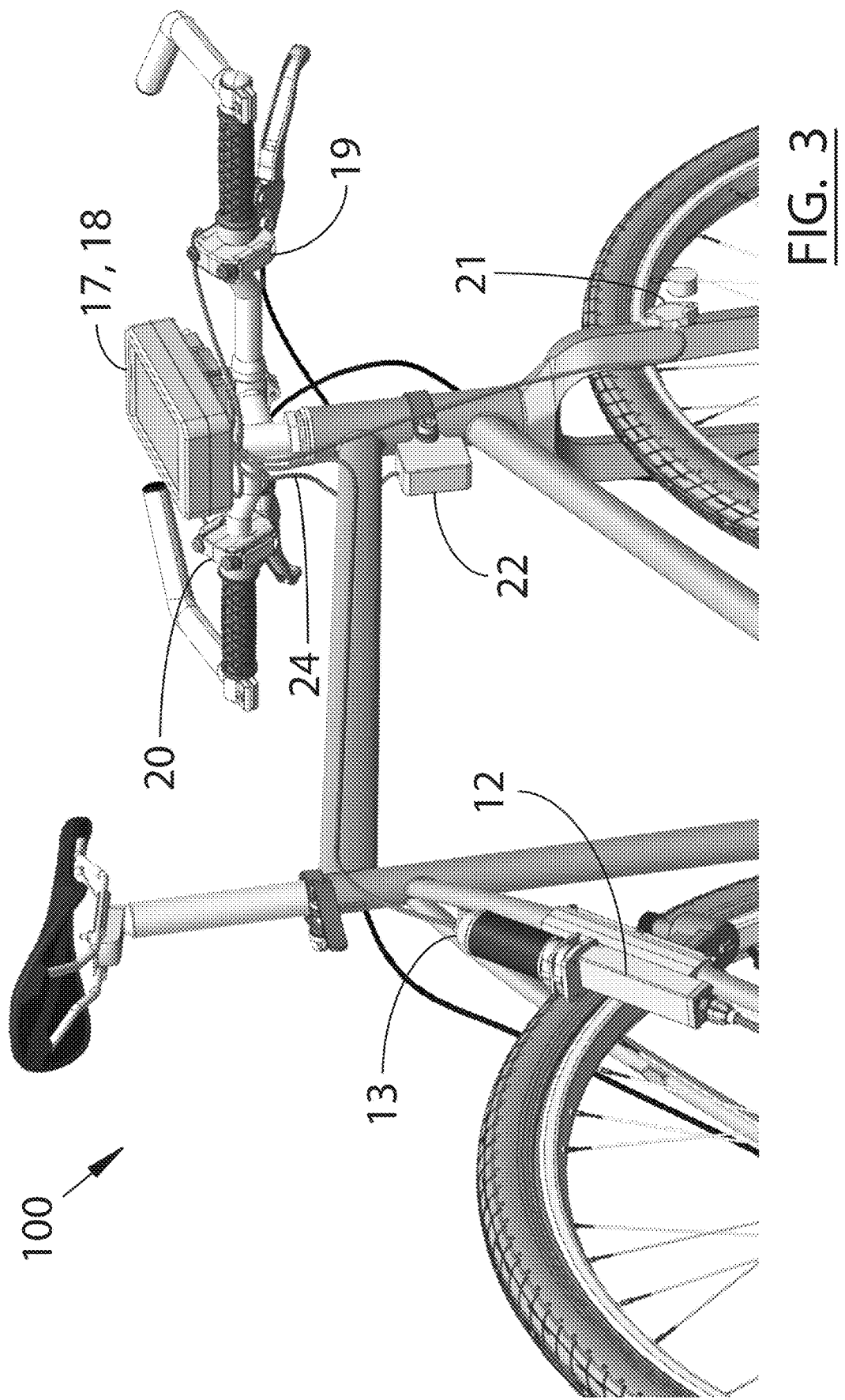
FIG. 3 is a perspective view of the touchscreen display, switches and control system of the preferred and alternate embodiments of the bicycle shifter user interface of the present invention in preferred location on the bicycle handlebars.

With reference to FIGS. 1-3 & 6 the preferred embodiment 100 of the bicycle shifter user interface of the present invention comprises geared rear hub 10 actuated through shifting cable coupling 11 slaved to servo linear actuator 12 making use of position encoder 13 for controlled draw of sheathed pull cable assembly 14 thereby providing different available power transmission ratios of gear hub 10 through chain drive 15 to bicycle pedals assembly 16, touchscreen display 17, controls assembly 18, geared rear hub manual and override electric shifting switches 19, geared rear hub manual and automatic selection electric shifting switches 20, bicycle speed sensor 21, inclinometer 22 with dynamo 23 serving as controls system expended power replenishment means. Partially shown wiring harness 24 serves to interconnect touchscreen display 17 to controls assembly 18, manual electric shifting switches 19, manual and automatic electric selection 20, bicycle speed sensor 21, inclinometer 22, dynamo 23, servo linear actuator 12 and encoder 13. FIG. 2 depicts angular positions denoted S1 through S6 of shifter cable coupling 11 for geared rear hub 10 depicted in this illustration as a six speed hub. It is additionally stressed that no limit exists on the number of speeds geared rear hub 10 could alternately have due to servo linear actuator 12 infinitesimal actuation capability with the only limitation being having sufficient travel to cover a smaller or larger actuation range.

Figure 4A:
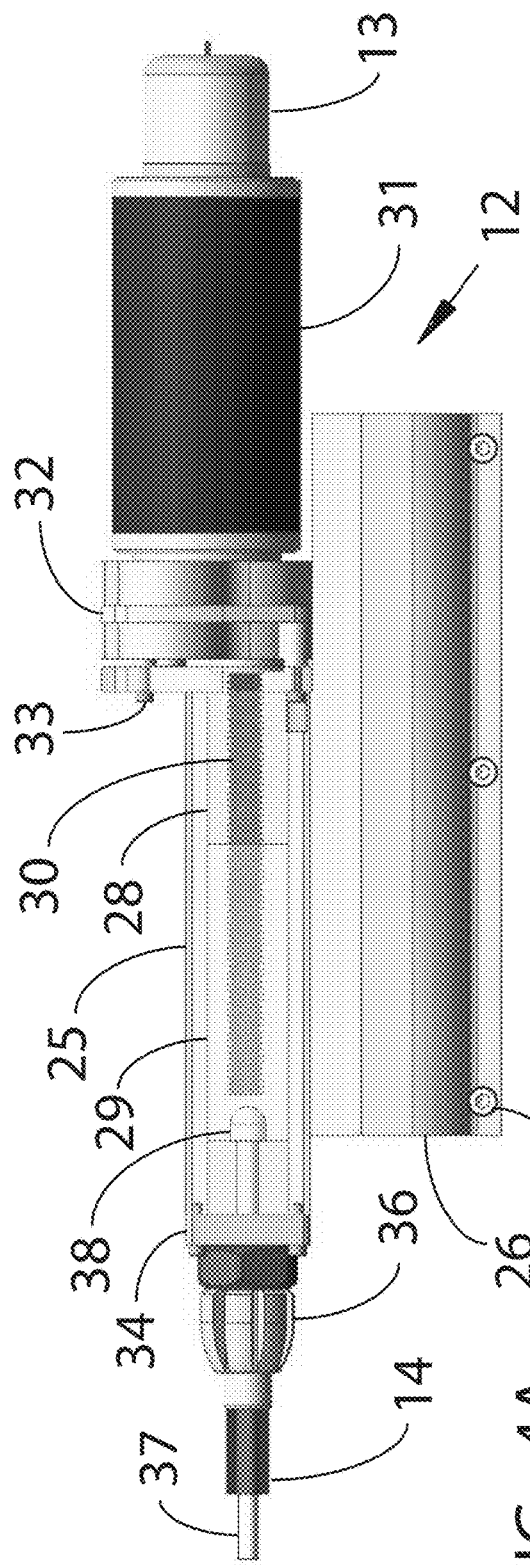
FIG. 4A is a side view of the novel cable shifting linear actuator of the preferred and alternate embodiments of the bicycle shifter user interface of the present invention.
Figure 4B:
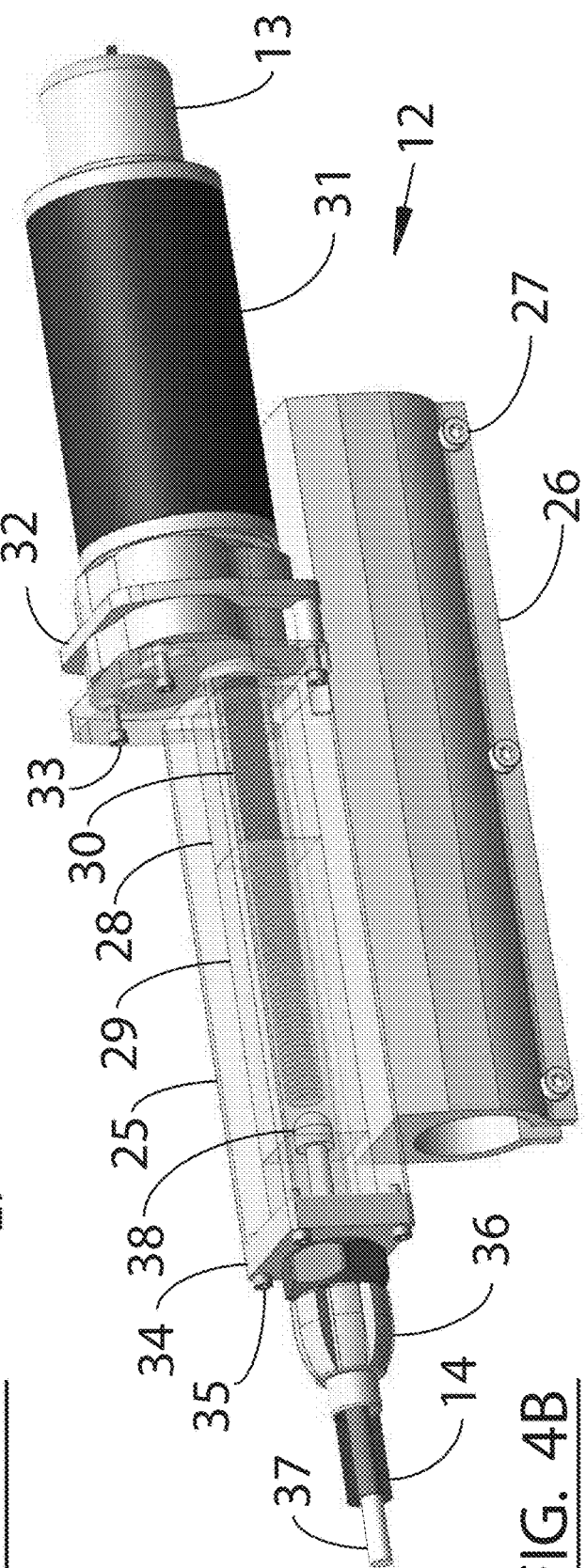
FIG. 4B is a perspective view of the novel cable shifting linear actuator of the preferred and alternate embodiments of the bicycle shifter user interface of the present invention.

Preferred Embodiment Linear Actuator—FIGS. 4A-4B.

With reference to FIGS. 4A and 4B, preferred embodiment of servo linear actuator 12 of the bicycle shifter user interface of the present invention comprises housing 25 affixed to bicycle frame (not shown) by mount 26 and retained thereof by screws 27 with housing 25 further comprising rectangular cavity 28 serving as rotational retaining means to slip fitting rectangular nut 29 linearly operable in the axial direction of rectangular cavity 28 about screw 30 rotationally powered by motor 31 through high reduction gearing reducer 32 secured to housing 25 by means of screws 33 with housing 25 additionally including threaded end plate 34 secured thereof by screws 35 and serving to secure fitting 36 of sheathed pull cable assembly 14 with actuation cable 37 secured to rectangular nut 29 through bonding thereof of bullet end ball detail 38. Encoder 13 attached to free end of armature 38 (not shown) of motor 31 serves as position encoding means for rectangular nut 29 and consequentially actuation cable 14 through accurate count of revolutions of armature 38 (not shown) of motor 31. It is additionally stressed that cavity 28 and mating slip fit nut 29 could have alternate anti-rotation cross sections including square, oval or other irregular shapes. It is also stressed that positive position encoding means for actuation cable could be achieved through a slide potentiometer mounted on side of housing 25 and permanently affixed to rectangular nut 29 through a tab penetrating a slot in side of housing 25 and thereby resulting in motion of wiper in same relationship at rectangular nut 29. Alternate position encoding means are additionally possible through attachment of single or multi-turn potentiometers to step gearing in reduction gearing reducer 32.

Figure 5:
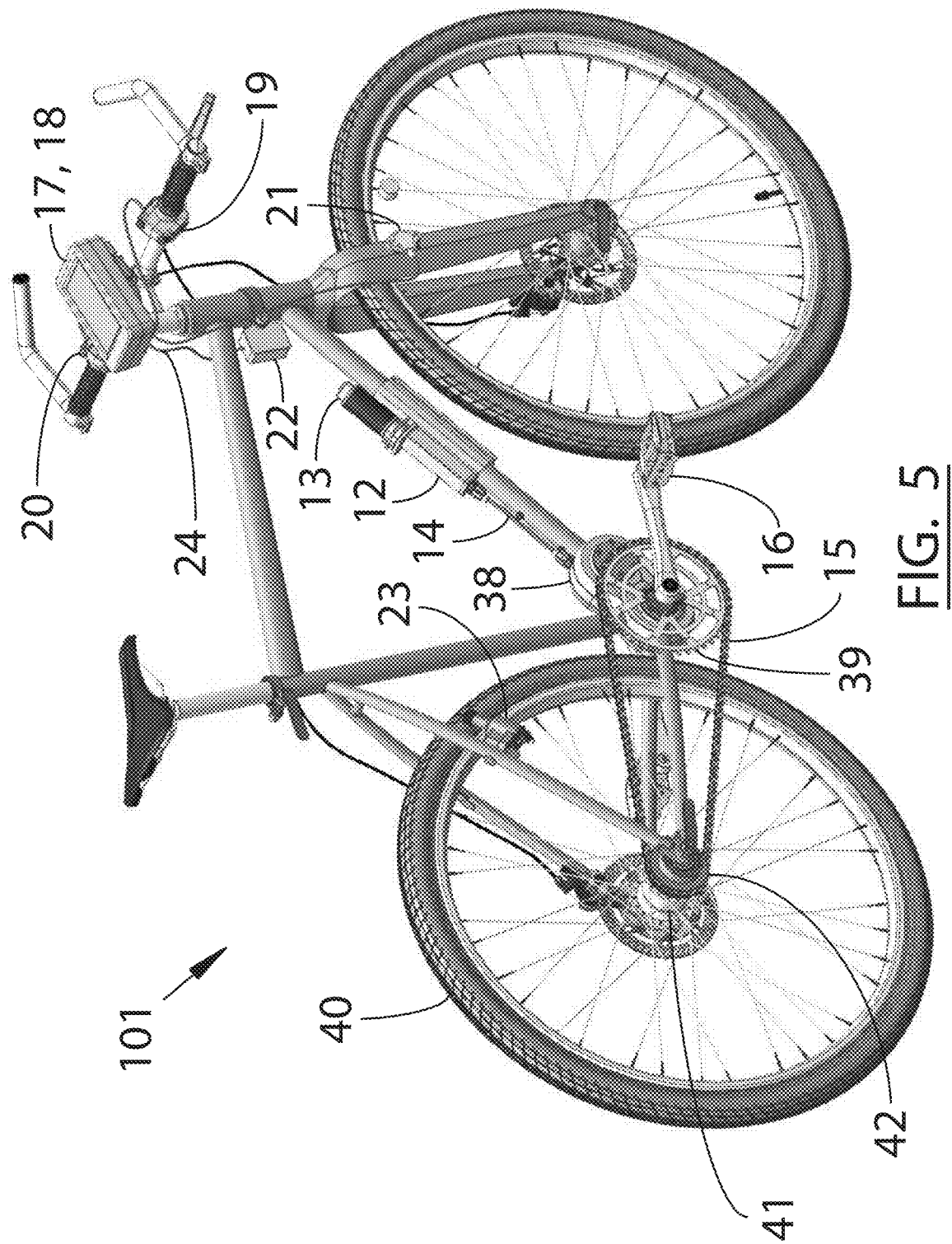
FIG. 5 is a perspective view of the preferred and alternate embodiments of the bicycle shifter user interface of the present invention and novel cable shifting linear actuator applied to an alternate bicycle powertrain design.

Alternate Embodiment Construction—FIG. 5.

With reference to FIG. 5, alternate embodiment 101 of the bicycle shifter user interface of the present invention comprises bicycle pedals actuated gearbox 38 serving to actuate at different ratios drive chain sprocket 39 slip fit to bicycle pedals assembly 16 and permanently engaging bicycle drive chain 15 serving to energize rear bicycle wheel 40 through freewheel hub 41 through forward ratcheting assembly sprocket 42 with gearbox 38 slaved to servo linear actuator 12 making use of position encoder 13 for controlled draw of sheathed pull cable assembly 14 serving to shift gearing of gearbox 38 thereby facilitating different available power transmission drive ratios between bicycle pedals assembly 16 and drive chain sprocket 39, touchscreen display 17, controls assembly 18, gearbox manual and override electric shifting switches 19, gearbox manual and automatic electric selection switches 20, bicycle speed sensor 21, inclinometer 22 with dynamo 23 serving as controls system expended power replenishment means. Partially shown wiring harness 24 serves to interconnect touchscreen display 17 to controls assembly 18, manual electric shifting switches 19, manual and automatic electric selection switches 20, bicycle speed sensor 21, inclinometer 22, dynamo 23, servo linear actuator 12 and encoder 13.

Figure 6:
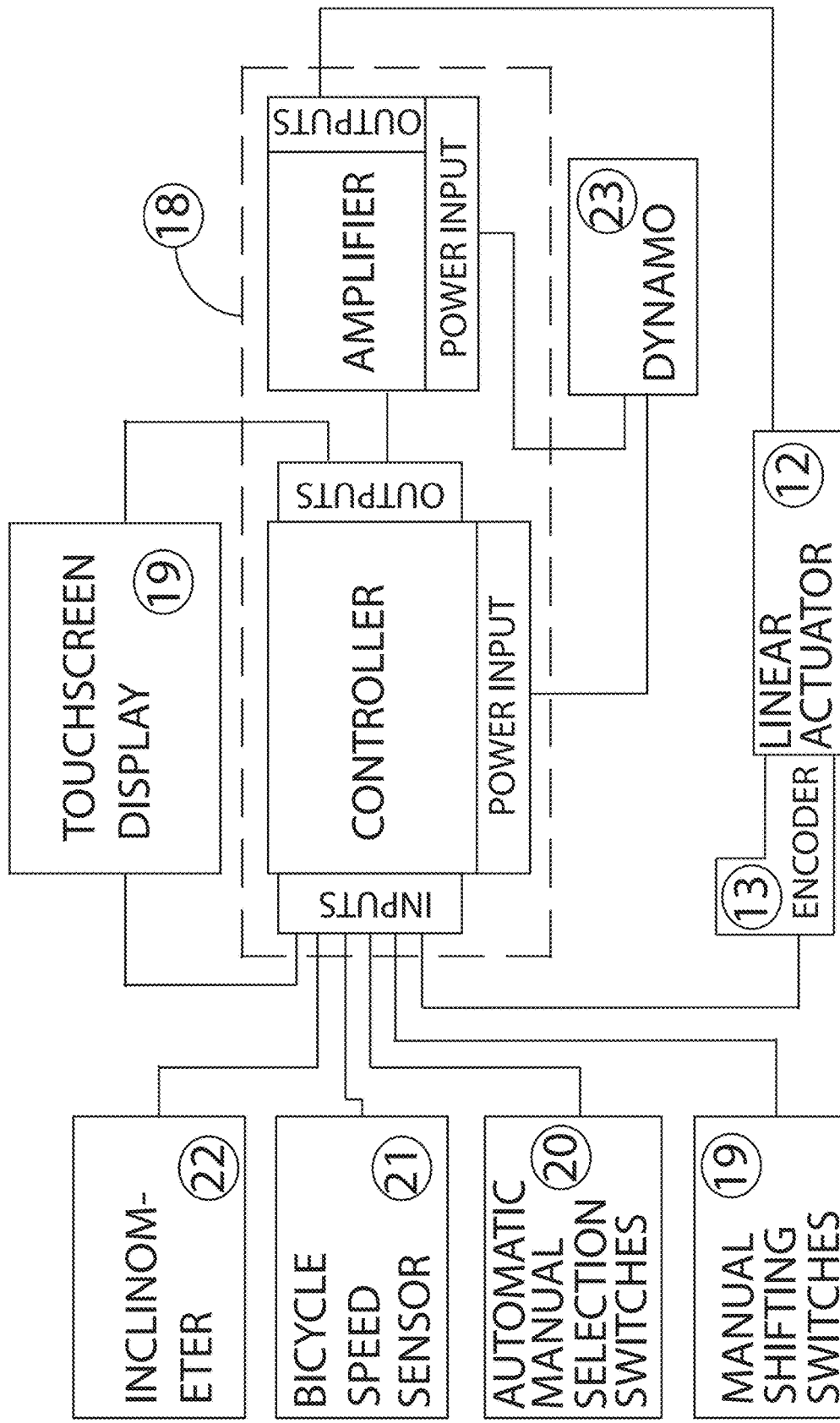
FIG. 6 is a block diagram of the control system and components of the preferred and alternate embodiments of the bicycle shifter user interface of the present invention.
Figure 7:
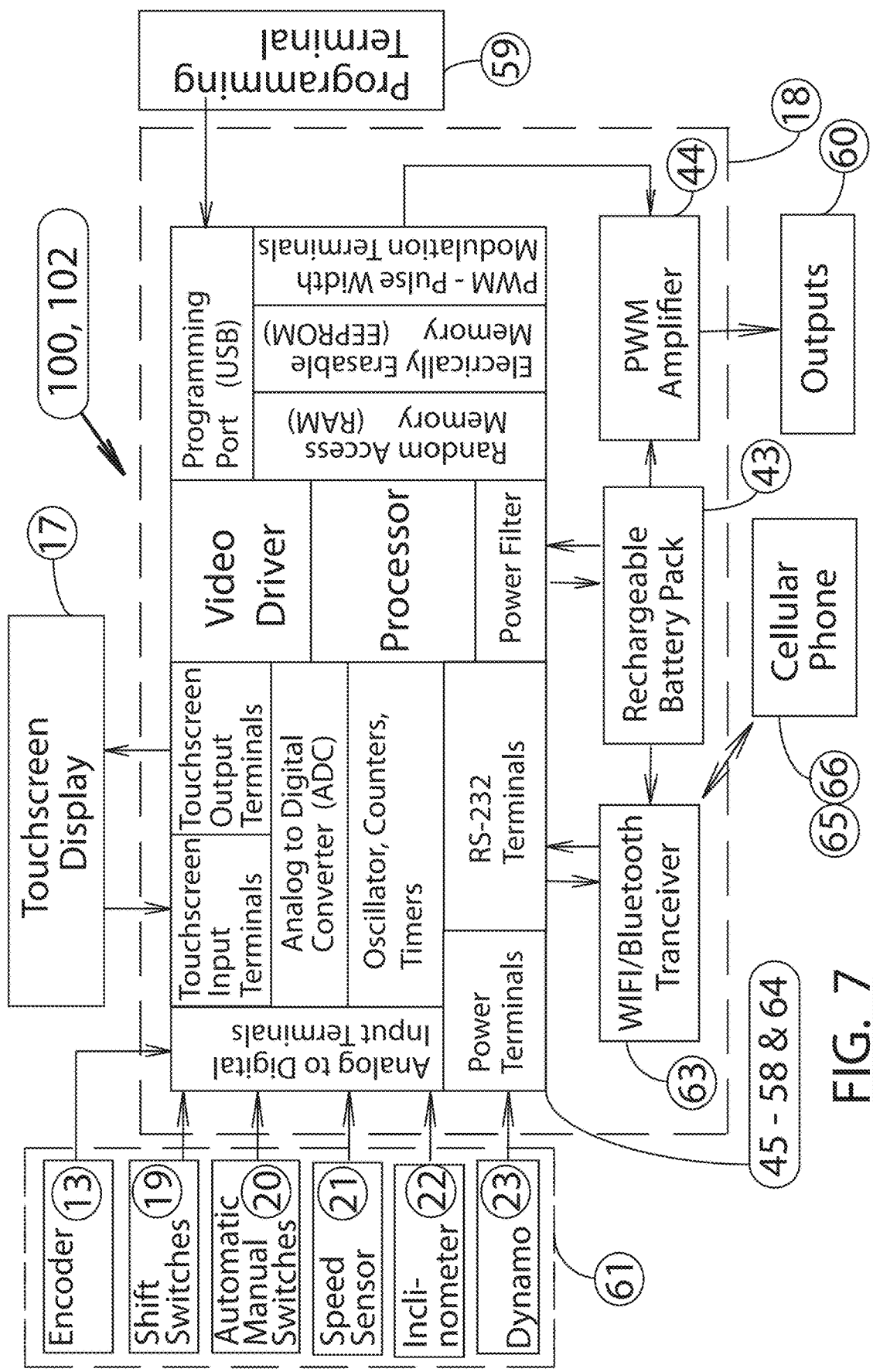
FIG. 7 is a block diagram of the controller of the preferred and alternate embodiments of the bicycle shifter user interface of the present invention.

Preferred and Alternate Embodiment Controls—FIGS. 6 & 7.

With reference to FIGS. 6 & 7, the preferred and alternate embodiments of the bicycle shifter user interface of the present invention includes control system 18 comprising steady power supply rechargeable battery pack 43, pulse width modulation (PWM) amplifier 44 and a controls section 45 comprising processor 46, video driver 47, random access memory (RAM) 48, oscillator/counters/timers subsection 49, analog to digital converter (ADC) subsection 50, and power filter 51, acting as an integral system serving to execute programming instructions received through universal serial (USB} programming port 52 and stored into electrically erasable programmable read only memory (EEPROM) 53 in order to control pulse width modulation (PWM) output terminals 54 in response to analog signals received through analog to digital (ADC) input terminals 55 and real time operator instructions from touchscreen display input terminals 56, display real time status through touchscreen display output terminals 57 with consumed power constantly being replenished through power terminals 58. Software updates to controls system 18 and touchscreen display 17 executed through programming terminal 59 are not limited to archiving existing user settings, downloading other users settings, installation of alternate user interfaces and patches geared to continually improve system performance of pulse width modulation (PWM) outputs 60 in response to inputs 61 comprising outputs of linear actuator encoder 13, manual and override shifting electric switches 19, manual and automatic selection electric switches 20, bicycle speed sensor 21 and inclinometer 22, and with power source dynamo 23 replenishing system consumed power through power terminals 58. WIFI/Bluetooth Transceiver 63 with bidirectional communication to control system 18 through RS-232 terminals 64 facilitates alternate wireless control of the preferred and alternate embodiments of the bicycle shifter user interface of the present invention through cellular phone 65 running a custom user interface and application communication software 66.

Figure 8:
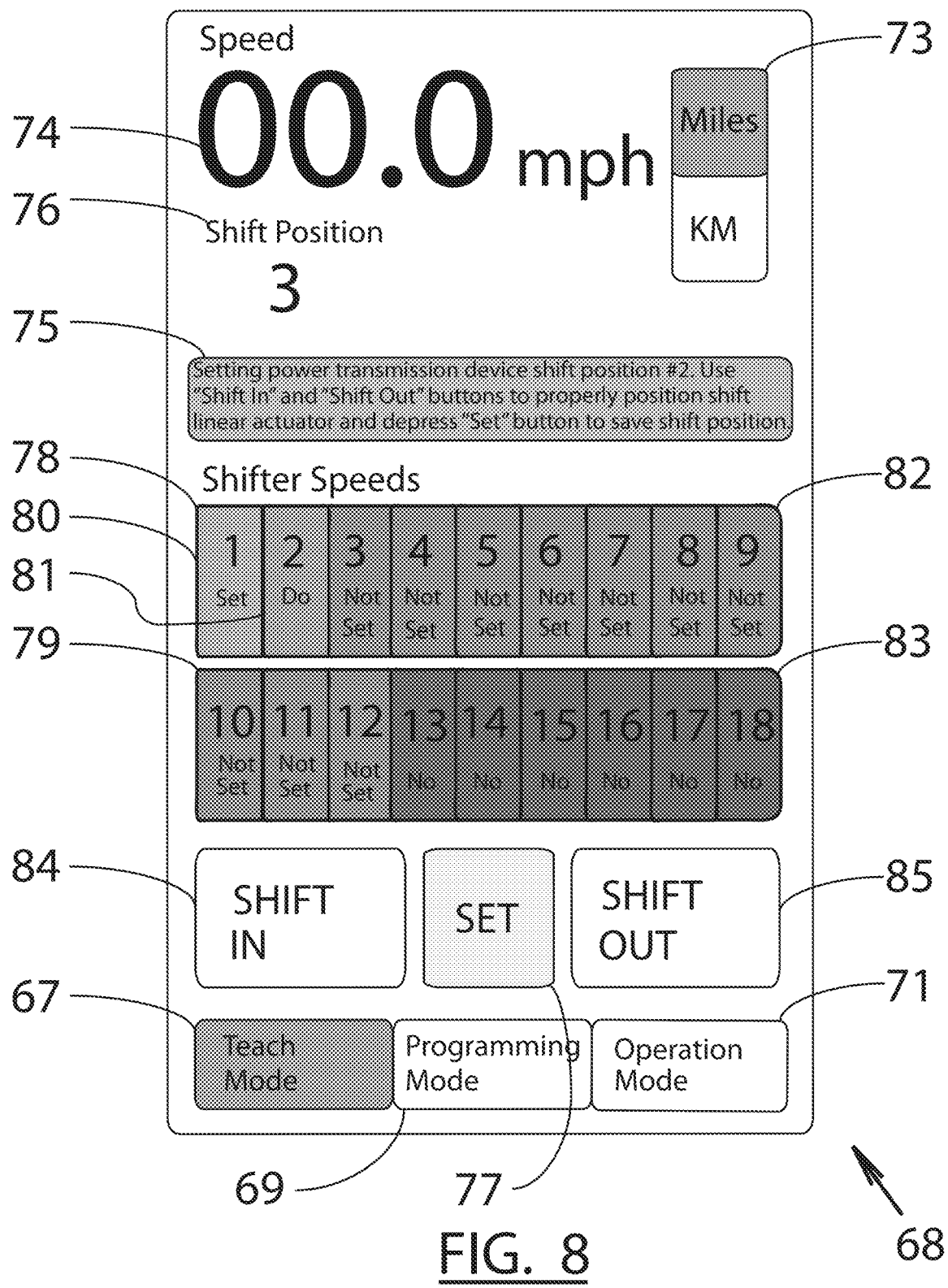
FIG. 8 is a view of the preferred touchscreen display "Teach Mode" user interface of the preferred and alternate embodiments of the bicycle shifter user interface of the present invention.
Figure 9:
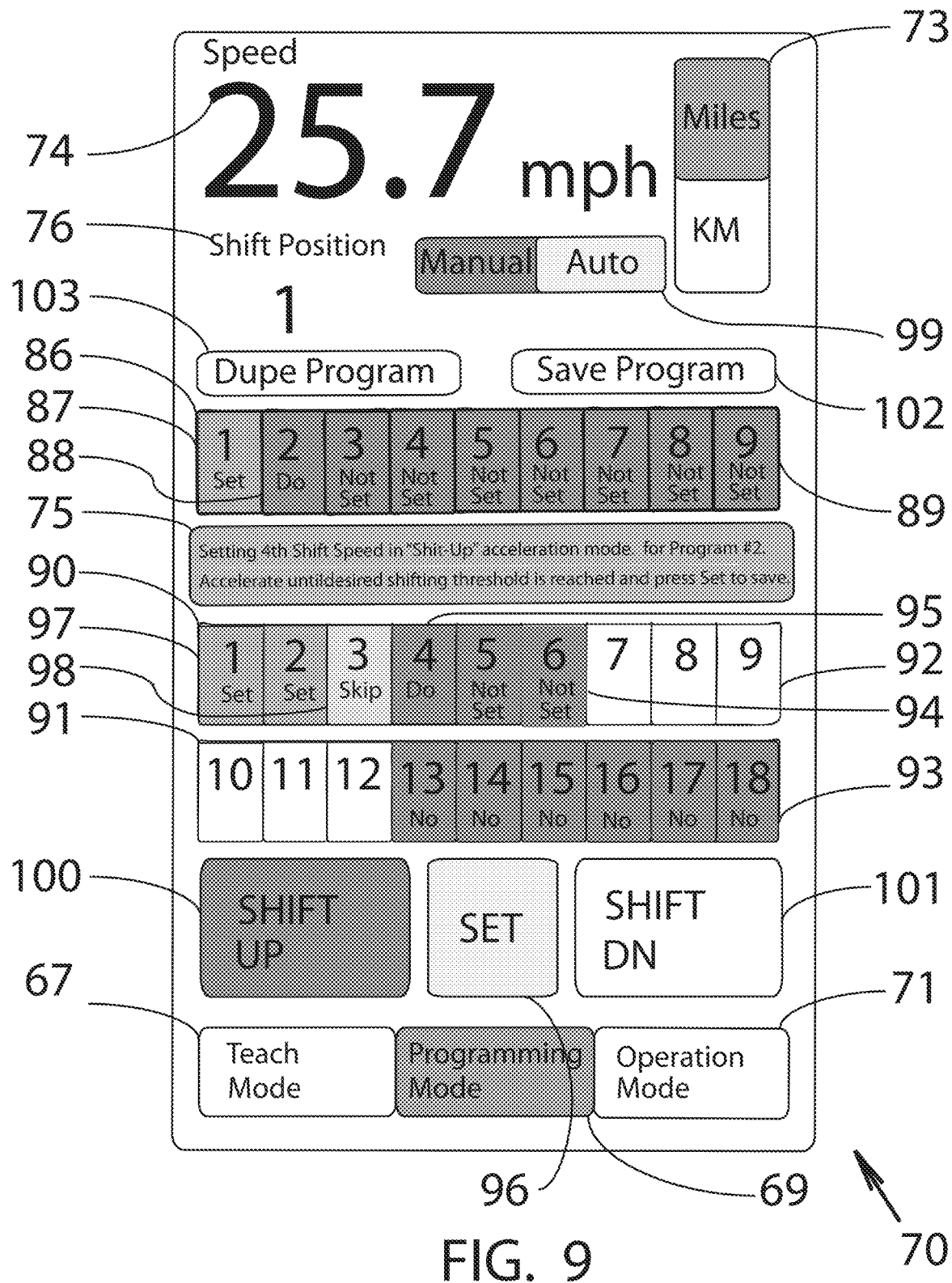
FIG. 9 is a view of the preferred touchscreen display "Programming Mode" user interface of the preferred and alternate embodiments of the bicycle shifter user interface of the present invention.
Figure 10:
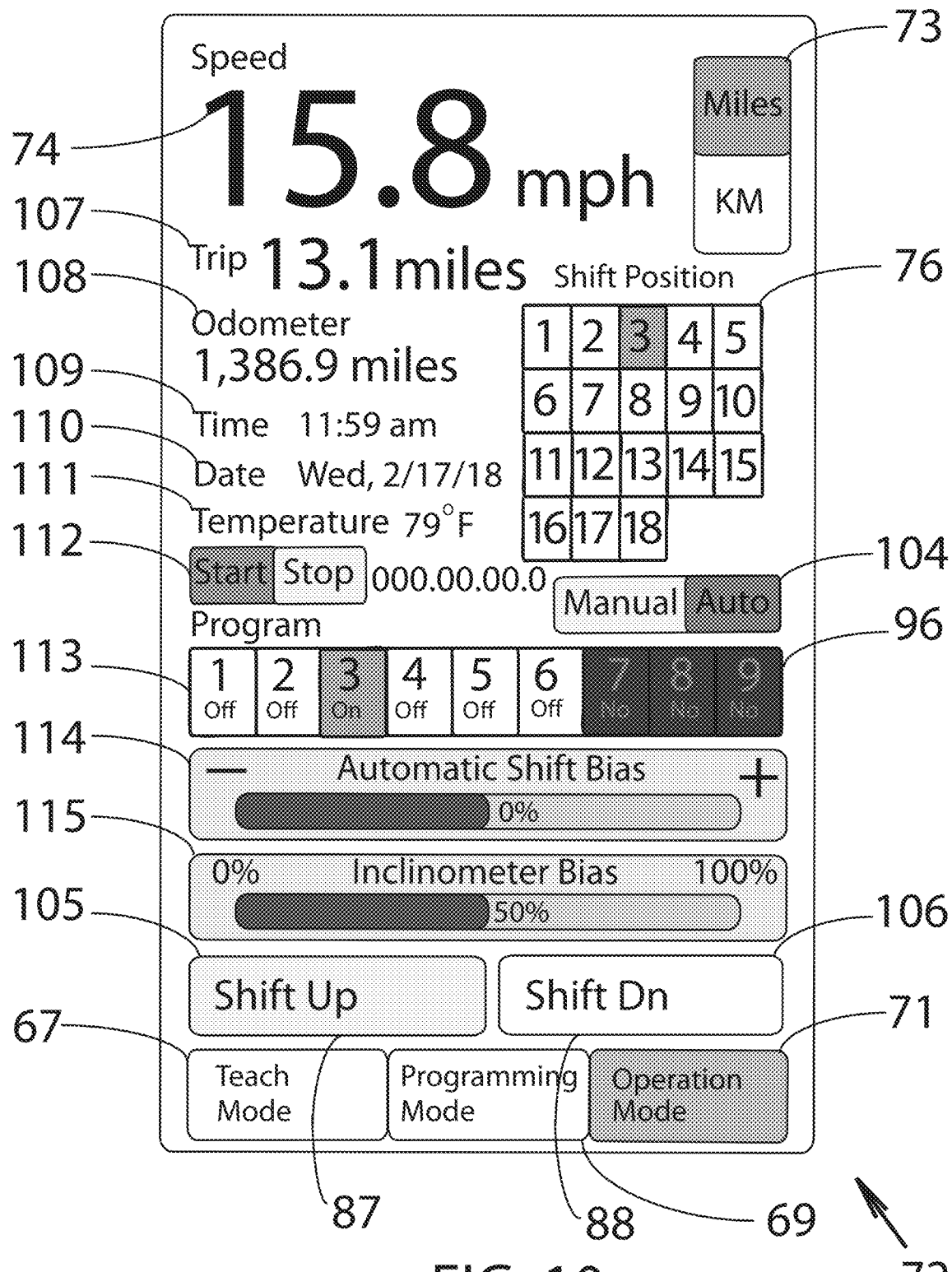
FIG. 10 is a view of the preferred touchscreen display "Operation Mode" user interface of the preferred and alternate embodiments of the bicycle shifter user interface of the present invention.

Preferred and Alternate Embodiment User Interface—FIGS. 8-10.

With reference to FIGS. 8-10, touchscreen display 17 of the preferred and alternate embodiments of the bicycle shifter user interface of the present invention includes "Teach Mode" selection button 67 used to enter into "Teach Mode" operator screen 68, "Programming Mode" selection button 69 used to enter into "Programming Mode" operator screen 70 and "Operation Mode" selection button 71 used to enter into "Operation Mode" operator screen 72. With henceforth reference of "power transmission device" meaning either geared hub 10 or gearbox 38, the "teaching", "programming" and "operation" of the touchscreen display user interface of the preferred and alternate embodiments of the present invention is as follows.

With reference to FIG. 8, touchscreen display 17 of the preferred and alternate embodiments of the bicycle shifter user interface of the present invention in "Teach Mode" operator screen 68 entered into either during motion of the bicycle or at a standstill by depressing button 67 which allows the user to define number of power transmission device shift positions and accurately position pull cable 37 of sheathed pull cable assembly 14 through proper actuation of servo linear actuator 12 for each available shift position with encoder 13 providing positional feedback to control system 18. "Teach Mode" screen operator screen includes speed selection switch 73 enabling user to select speed and distance units in Miles or kilometers (KM), bicycle speed display 74, user prompt window 75 used in "Teach Mode" screen 68 to walk user throughout setup prompting user for number of power transmission device speeds entered through window 76 initially displaying a value of "1" and incrementing with each user tap to window 76 until the correct number of power transmission device speeds is displayed followed by user tapping set button 77 for entry thereof, with window 75 subsequently walking user through setting of power transmission device actuation positions as depicted in windows 78 and 79 reflecting number of power transmission device shift positions defined through window 76, with defined power transmission device shift positions 80 depicting text "Set" in green background highlight and with power transmission device shift position being defined 81 in gray background highlight and depicting text "Do", power transmission device shift positions yet to be set 82 depicting text "Not Set" in amber background highlight and with shift positions exceeding number of shift position defined by the user for power transmission device 83 in dark ray highlight and depicting text "No". User can alternately enter number of desired speeds of power transmission device by simply depressing proper number displayed in windows 78 and 79 rather than tapping window 76 with this action causing windows 78 and 79 reflecting user preference as just defined. "Shift In" button 84 and "Shift Out" button 85 are used to forward and reverse actuate servo linear actuator 12 in order to accurately position actuation cable 37 of sheathed pull cable assembly 14 for position being defined in window 81 prior to user depressing "SET" button 77 to set, an action causing reading from encoder 13 to be stored into (EEPROM) memory 53. Once a shift position is set, user prompt window 75 and power transmission device position windows 76, 78 and 79 all update to guide user through setting of following power transmission device shift position with process continuing until all desired shift positions depicted in shift position windows 78 and 79 are defined. Once all power transmission device shift positions are defined prompt window 75 instructs user to depress button 69 to enter into programming mode.

With reference to FIG. 9, touchscreen display 17 of the preferred and alternate embodiments of the bicycle shifter user interface of the present invention in "Programming Mode" operator screen 70 entered into by depressing button 69 comprises bicycle miles or kilometers (KM) units selection switch 73, bicycle speed display window 74, bicycle power transmission device shift position window 76, user prompt window 75 serving in "Programming Mode" to walk the user through programming of the power transmission device for up to 9 distinct shift speed programs as depicted in window 86 starting with default program 1, with programmed positions 87 denoted by text "Set" depicted with a green background highlight, active programming position 88 denoted by text "Do" depicted with a gray background highlight, and with undefined program positions 89 denoted by text "Not Set" depicted with an amber background highlight. Upon entry into "Programming Mode", window 75 prompts the user to define the number of desired "Shift Speeds" to program entered by depressing desired number from shift positions displayed in windows 90 and 91 depicting all available power transmission device shift positions previously defined in "Teach Mode" screen 68 depicted with a white background 92 and with unavailable power transmission device shift positions 93 denoted by text "No" depicted in dark gray background highlight. User input into windows 90 and 91 indicating desired shift positions to program being any number from 2 up to any of shift positions defined in "Teach Mode" screen 68, subsequently causes all shift positions 94 previously defined in "Teach Mode" screen 68 up to and including depressed power transmission device shift position, to be denoted by text "Not Set" depicted with amber background highlight confirming user of availability for programming except for position 1 which is denoted by text "Set" indicating position is default from standstill and with position 2 denoted by text "Do" indicating being active for programming. Window 75 prompts the user to program shift position 95 denoted by text "Do" and depicted with a gray background highlight by accelerating the bicycle to desired shifting speed threshold and depressing set button 96 once the shifting speed threshold for that position is reached to set. Upon definition, a programed shift position 97 is denoted by text "Set" and is depicted with a green background highlight, with window 75 prompting the user to program the following shift position 95 which is then denoted by text "Do" and is depicted with gray background highlight. User again, accelerates to desired shifting speed threshold for that shift position and depresses set button 96 once that shifting speed threshold is reached to set. Windows 75, 90 and 91 then update for programming of following shift position with process continuing until all desired shift positions are programmed. User is additionally granted the ability to define "skip speeds" for the power transmission device by depressing any of the "Not Set" shift positions 94 following active shift position denoted by text "Do" depicted with a gray background highlight with action causing skipped over active position or positions 98 to be denoted by text "Skip" and are depicted in a yellow highlight background, and with the depressed position then denoted by text "Do" for programming and is depicted with a gray background highlight, thereby enabling capability of operating the bicycle with less shifts throughout range of bicycle operation than available by the power transmission device. With automatic or manual switch 99 always defaulting to manual mode for programming upon entry into programming mode, user can enter into automatic mode by depressing auto or manual selection switch 99 at any time to test programmed speeds in an automatic operation mode of the bicycle with windows 76 always displaying the active shift position, and with windows 90 and 91 denoting the next shift position by text "Do" and a gray background highlight for reprogramming as desired. As it is often desired to vary the shifting speed threshold depending on whether the bicycle is accelerating or decelerating, "Shift Up" button 100, default upon entry into programming mode 70 and depicted in gray background highlight denoting it is active, is used to defined shifting speed thresholds during acceleration. "Shift Dn" button 101, conversely, when depressed at will, assumes a gray background highlight denoting user has entered into mode to define deceleration shifting speed thresholds with the action being totally arbitrary and available only post the user depressing "Shift Dn" button 101 with up to and/or lack of this action thereof causing the shifting speed thresholds defined in acceleration mode to also apply during deceleration. Available in either manual or automatic mode, save program button 102 can be depressed at any time to save programmed speed positions for active program position 88 denoted by text "Do" and depicted with a gray background notwithstanding whether all desired shift speeds are defined or not. User can switch to another program number at will to start a new program by depressing any of program positions 89 in window 86 denoted by text "Not Set" and depicted with an amber background highlight for programming of that program number also notwithstanding whether all positions in the prior program were all defined or not. Also, available in either manual or automatic mode, "Dupe program" button 103 serves to duplicate last saved program into active program position 88 denoted by text "Do" and depicted with a gray background at any time and activate that program. For maximum flexibility, no restriction is placed on programming of shift positions, skipped shift positions, repetition of shift positions or the number of shift programs prior to the user being able to enter into operation screen 72.

With reference to FIG. 10, touchscreen display 17 of the preferred and alternate embodiments of the bicycle shifter user interface of the present invention in "Operation Mode" operator screen 72 entered into by depressing button 71 comprises bicycle miles or kilometers (KM) units selection switch 73, bicycle speed display window 74, bicycle power transmission device shift position window 76, auto or manual command button 104 serving to place power transmission device in automatic or manual mode, manual and override "Shift up" button 105, manual and override "Shift down" button 106, accumulated trip mileage 107, odometer 108, time 109, date 110, temperature display 111 which defaults to degrees "Fahrenheit" units if miles units are selected through button 73 or degrees "Celsius" units if KM units are selected, stop watch 112, and program buttons\113 used to activate shift programs defined through "Programming Mode" screen 70 and depicted in window 113 with a white background and are denoted with an "Off" designation and which upon activation take on a gray background and are then denoted with an "On" designation while selection buttons not programmed in "Programming Mode" screen 70 are displayed in a disabled black background and displayed with a "No" designation, "Automatic Shift Bias" touch control slide bar 114 serving to permit user to scale up or down programmed speed shifting thresholds of programmed speed positions in aforementioned programming position of "Programming Mode" screen 70 for active program selection in window 113 denoted with "On" designation based on user preference in real time, and "Inclinometer Bias" road inclination touch control slide bar 115 serving to proportionately scale up of down automatically configured attenuation to programmed shifting speed thresholds in aforementioned "Programming Mode" screen 70 for active program selection in window 113 denoted with "On" designation, in order to achieve acceptable pedaling effort levels based on road inclination and conditions in real time.

The claims of the bicycle shifter user interface of the present invention are as follows:

1. A bicycle gearbox shifter user interface comprising:
   d) an electrically powered touchscreen display including a "teach mode" screen, a "programming mode" screen, and an "operation mode" screen,
   h) said "teach mode" screen including a "teach position" display window depicting a "shift position" selection, and a "shift in" and "shift out" buttons for accurate positioning of a shifting linkage of a bicycle gearbox for said "shift position",
   i) said "programming mode" screen including a "shift position" display window depicting selection to program, and a "set" button for programming of a respective "shift speed" of a bicycle,
   j) said "programming mode" screen additionally including a "shift up mode" button permitting limiting said programmed shift speeds solely to upshifting and a "shift down mode" button limiting said programmed shift speeds solely to downshifting,
   k) said "programming mode" screen further including a "skip" button permitting limiting number of "shift positions", and
   l) said "operation mode" screen including a "shift position" override "shift up" and "shift down" buttons,
Whereby said user interface enables a user to define a "shift speed" for each "shift position" of said bicycle in an exacting manner to suit individual need.

2. The user interface of claim 1 wherein said "operation mode" screen include a sliding control bar for attenuation of said programmed "shift speeds" for said "shift positions".

3. The user interface of claim 1 further including buttons for definition and selection of multiple "shift speed" programs.

4. The process for teaching, programming and operation of a geared bicycle shifter comprising:
   d) providing an electrically powered touchscreen display with a "teach mode" screen, a "programming mode" screen, and an "operation mode" screen,
   h) providing said "teach mode" screen with a "teach position" display window depicting a "shift position" selection, and a "shift in" and "shift out" buttons for accurate positioning of a shifting linkage of a bicycle gearbox for said "shift position",
   i) providing said "programming mode" screen with a "shift position" display window depicting selection to program and a "set" button for programming of a respective "shift speed", and
   j) providing said "programming mode" with an additional "shift up mode" button permitting limiting of said programmed shift speeds solely to upshifting and a "shift down mode" button for limiting said programmed shift speeds solely to downshifting,
   k) providing said "programming mode" with an additional "Skip" button permitting limiting number of "shift positions", and
   l) providing said "operation mode" screen with a position override "shift up" and "shift down" buttons,
Whereby said process enables a user to define a bicycle "shift speed" for each "shift position" in an exacting manner to suit individual need.

5. The process for teaching, programming and operation of a geared bicycle shifter of claim 4 further provided with a sliding control bar capability for attenuation of said programmed "shift speeds" for said "shift positions".

6. The process for teaching, programming and operation of a geared bicycle shifter of claim 4 further provided with an additional capability to define, save and run multiple shifting programs.

* * * * *